United States Patent [15] 3,677,251
Bowers [45] July 18, 1972

[54] BODY ORGAN STIMULATOR WITH INTERFERENCE REJECTOR

[72] Inventor: David L. Bowers, West Allis, Wis.
[73] Assignee: General Electric Company
[22] Filed: March 10, 1970
[21] Appl. No.: 18,132

[52] U.S. Cl. ...................................................... 128/419 P
[51] Int. Cl. .............................................................. A61n 1/34
[58] Field of Search ........................................... 128/419–423

[56] References Cited

UNITED STATES PATENTS 3,528,428  9/1970  Berkevits ............................ 128/419 P
3,431,912  3/1969  Keller, Jr. ............................ 128/419 P Primary Examiner—William E. Kamm
Attorney—Jon Carl Gealou, Frank L. Neuhauser, Oscar B. Waddell, Joseph B. Forman and Arthur V. Puccini

[57] ABSTRACT

A pace pulse generator connects to an organ which is to be electrically stimulated. Natural and artificial stimulating signals on the body are detected and used to control the pace pulse generator. An interference rejector distinguishes between detected natural body signals and extraneous electrical interference. The rejector is also adaptable for control of atrial and ventricular tachycardia and arrhythmia in connection with heart stimulators.

1 Claim, 1 Drawing Figure

Patented July 18, 1972
3,677,251
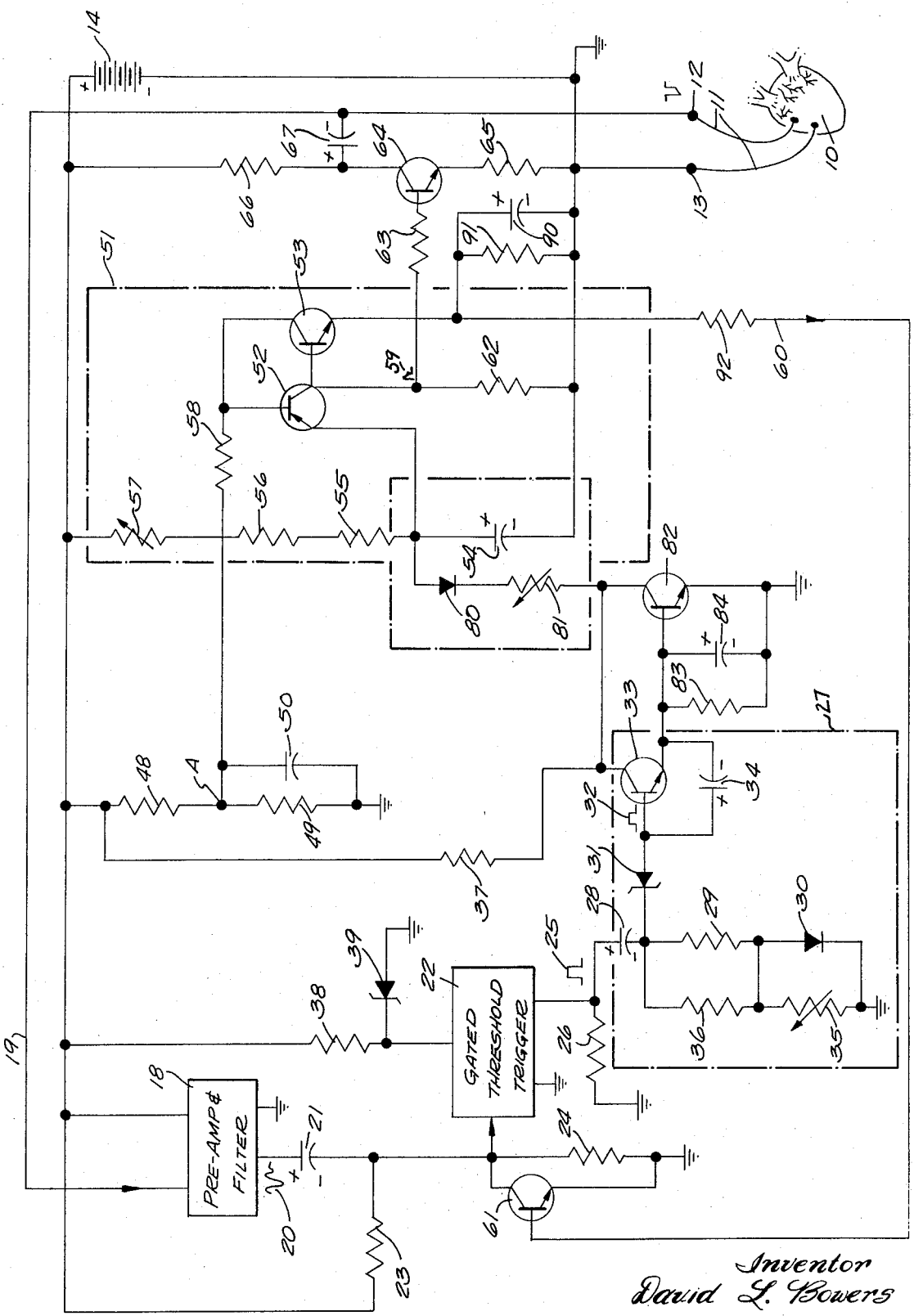
Inventor
David L. Bowers
By Ralph G. Hohenfeldt
Attorney

BODY ORGAN STIMULATOR WITH INTERFERENCE REJECTOR

BACKGROUND OF THE INVENTION

Electric pulse generators have been used internally and externally of the body for stimulating a body organ to function in the absence of natural electric or nerve impulses. Stimulation of the bladder, ureter and the atrium and ventricles of the heart, are common examples. When cardiac stimulators are used in subjects which have certain types of defects in the conduction system of their hearts, it is important to be able to distinguish between natural and control stimulating potentials and artificial stimulating pulses so that if the former is present the latter will not compete with it and cause a functional irregularity in the heart.

In order to minimize possibility of competition, to let the heart function in response to its natural electric potentials whenever it can, and to conserve battery power, a standby-type of Pacemaker has been developed. This device is otherwise known as a standby or demand heart pacer. The pacer has a pulse generator which connects to the heart and stimulates it with a substituted artificial pulse for every natural stimulating pulse that is absent. When a natural beat occurs, the next stimulating pulse that would ordinarily be furnished by the pulse generator, is inhibited. An improved standby pacer which permits the heart to operate over a physiologically acceptable range of rates before any artificial stimulus is applied, is described in the co-pending application of the instant inventor, filed Mar. 10, 1970, Ser. No. 18,051. This application is assigned to the assignee of the instant application.

Standby and demand pacers, the older type of fixed rate pacers, and other organ stimulators too are subject to their normal operating mode being disrupted by interferring electric signals which are generated by muscle potentials and the like in the body or which appear in the body as a result of their being radiated from an extraneous source. A common type of interference is that which is radiated by electric shavers, electric drills and auto ignition. This type of interference and even interference coming from ordinary power lines has been known to adversely affect prior types of stimulators by causing them to turn off when they should be on or vice-versa, or to revert to some other type of undesirable operating mode which defeats their intended purposes.

Another problem with prior stimulators is that on some occasions an organ could function at an abnormally high rate, such as in tachycardia of the heart and arrhythmic disturbances, and the stimulator would lose control over the organ. Stimulators of the standby-type would sense the high activity and turn off and stay off or would turn on and stay on. It has been discovered, however, that with some organs, if artificial stimulating pulses are injected at an appropriate time, natural rhythm of the organ will be restored and control by the stimulator may be recaptured.

SUMMARY OF THE INVENTION

An object of the present invention is to overcome some of the above disadvantages and to provide new stimulator functions by means of a novel interference rejector.

Another object is to provide an interference rejector which can distinguish desirable pulses of one repetition rate range from pulses of another repetition rate range which are associated with interference so that suitable control signals may be derived to control the operating mode of the pace pulse generator or other component of a stimulator.

A more specific object of this invention is to provide an interference rejector which, in addition to it being able to distinguish between naturally produced pulses and pulses due to interference, is capable of distinguishing between normal and abnormal functional rates of the organ resulting from response to its own electric impulses. This object is exemplified in a heart pacer which is adapted to turn on or fail-safe and stimulate the heart at a desired rate in the presence of significant interference as opposed to prior stimulators which either ran away or turned off or functioned randomly or exhibited someother malfunction in the presence of interference. Interference may be defined as any unwanted signals which disrupt intended operation of the pace pulse generator. For test purposes, control signals may be injected into the detector to produce system response needed for analyzing system performance according to the invention. Control signals may be of proper intensity to provide control.

Although the concepts for the interference rejector herein proposed are generally applicable to stimulators, the invention will be described primarily as it relates to a standby heart pacer. Those skilled in the art will appreciate how to apply the principles of the invention to different kinds of heart pacers and other stimulators as well.

In general terms, the illustrative heart pacer comprises a pace pulse generator which controls a stimulating pulse generator whose output terminals are connectable to the heart to stimulate it in the absence of natural heart impulses. There is also a detector system for detecting both body generated, control, and artificial stimulating signals within the body. The detector delivers corresponding output pulses to the interference rejector. The interference rejector receives pulses which are properly processed and gated along with pulses that result from interference. If the combined input pulse rate to the rejector is too high or outside of limits, the rejector has one output state and if the pulses are at a rate that is within the predetermined range, the rejector reverts to another output state. These alternate states are employed to exercise a control function over the pace pulse generator so it will inject stimulating pulses to recapture control if the heart is in tachycardia, or if there is significant interference, it will stimulate the heart at a known rate rather than allow the heart to miss beats, thereby failing-safe if there is significant interference.

A more detailed description of an illustrative embodiment of the invention will now be set forth in reference to the drawing.

DESCRIPTION OF THE DRAWING

The drawing shows a circuit diagram of a standby heart pacer with the new interference rejector and tachycardia and arrhythmic control incorporated therein.

DESCRIPTION OF A PREFERRED EMBODIMENT

At the far right of the drawing an organ to be stimulated, such as a heart 10, is depicted. The standby pacer output terminals 12, 13 may be connected to the heart by leads 11 which may attach to the myocardium or which may be an intravenous conductive catheter for stimulating interiorly of the heart. Leads 11 may serve the dual purpose of delivering artificial pacing pulses to the heart and detecting the presence of natural heart potentials although separate leads could be used for these purposes.

Except for leads 11, the other circuit elements shown are usually encapsulated in solid epoxy resin and coated with a body compatible silicone moisture barrier so that the device may be implanted in the body. The device may also be situated outside of the body in which case an intravenous conductive catheter leading to the heart may provide stimulating pulses and also detect any signals on the heart.

The pacer is powered by a six-cell battery 14 which has an initial terminal voltage of about 8 volts in this case.

At the left of the drawing, the first stage of the pacer is shown in block form and includes a preamplifier and twin-T filter identified by the reference numeral 18. The frequency filter 18 is part of a detector system. It should be noted that filter 18 is designed to be selective on the basis of signal frequency content, not signal repetition rate as is the case with the new interference rejector. Detected natural heart signals and artificial heart stimulating pulses are introduced to the filter by way of conductor 19 which connects to the heart by means of an output terminal 12. The pass-band of frequency filter 18 is preferably between 20 and 40 Hz. When a natural or artificial heart signal having selected frequency components is received, filter 18 is shocked and produces a ringing output signal of the form marked 20 on the output side of the filter. Sometimes the polarity of the heart signal reverses but the alternate ringing signal 20 is produced by the filter regardless of whether the incoming signal is positive or negative. Interference signals inherent in the body and derived from outside sources are also detected sometimes and even though they may produce ringing signals or appear elsewhere, their effect is vitiated by the interference rejector which will be described hereafter.

The ringing signal 20 that corresponds with detected body signals to the filter is a-c coupled through a capacitor 21 to a gated threshold trigger 22 which is shown in block form.

The input circuit to trigger 22 includes a bias voltage divider comprising resistors 23 and 24. Trigger 22 is normally biased off but it will turn on and emit an output pulse 25 whenever it integrates the positive swings of a ringing pulse 20. Trigger 22 may be adapted to produce output pulses 25 for every incoming pulse 20 or it may be selectively inhibited so that only pulses occurring under certain circumstances, such as of amplitude and duration, are transmitted. Inhibition is accomplished in this example by rendering a transistor 61 conductive at the proper moment, in which case, the bias point between resistors 23 and 24 is clamped to ground and the trigger 22 is insensitive to incoming signals. An occasion for inhibiting would be when it is desired to prevent artificial stimulating pulses which are also detected on the heart and the body from producing an output pulse 25 from the trigger. Normally, there will be a pulse 25 coincident with every natural heart beat which means that pulses 25 will normally occur within physiological rate limits. Higher rate pulses are usually associated with interference or with the heart undergoing tachycardia or arrhythmia.

Pulses 25 appear at the top of a resistor 26 from which they are applied to the input of a novel interference rejector which is enclosed in a dash-dot rectangle and labelled 27. The interference rejector will hereafter be called a rejector for brevity.

In one embodiment, the rejector is adapted to reject repetitive signals having an interpulse period which corresponds to a rate greater than 120 pulses per minute. In many cases, this rate coincides with the desired physiological limits. Signals with a shorter period or greater rate may result from existence of interference caused by electric shavers, electric drills, auto ignitions and the like. A shorter period between any two consecutive signals may also occur if the heart is arrhythmic or in tachycardia.

Although for ordinary interference rejection, such as used in the standby pacer, stable supply voltage is not imperative, such stable voltage is important and required if the rejector is adapted for tachycardia and arrhythmic control. For this reason, the trigger point of the threshold trigger 22 is made very stable by use of a zener diode 39 having a current limiting resistor 38 in series with it. Use of the zener diode enables stable operation, although the battery 14 is somewhat depleted, as long as the battery voltage has not dropped below zener voltage. In pacers that are modified for tachycardia and arrhythmic control, the pulse width from the trigger to the input capacitor 28 of the rejector must always be long enough to fully charge capacitor 28 to a predetermined fixed level. This accounts, in part, for the need of a very stable supply voltage.

The rejector includes capacitor 28 and a series charging path for it comprising a low parallel resistance value resistors 29 and 36 in series with a diode 30 which is forward-biased when the capacitor charges. Thus, pulses 25 will charge capacitor 28 to a certain level with a short charging time constant. Between pulses, capacitor 28 is discharged slowly through a circuit which includes resistor 26, a ground path, a high value resistor 35 and parallel resistors 29, 36. Diode 30 is reverse-biased during discharge of capacitor 28. Hence, the capacitor charges rapidly and discharges slowly.

If pulses 25 are delivered to coupling capacitor 28 at a relatively low rate, the interpulse period will have been sufficiently long to permit the capacitor to discharge appreciably. An ensuing pulse will then deliver charge to the capacitor and this charge will flow through the low resistance parallel combination of resistors 29 and 36 and diode 30. This will produce a voltage at the top of resistor 29. If the voltage is great enough, current will also flow through zener diode 31 and a pulse 32 will appear on the anode side of the zener diode and at the base of transistor 33.

If pulses due to detected body signal, control signal or interference signals are delivered to coupling capacitor 28 at a relatively high rate, there will be insufficient interpulse time for the capacitor 28 to discharge appreciably. Consequently, high rate pulses will encounter a coupling capacitor 28 that is more fully charged in which case little or no initial current will flow through resistors 29 and 36 in series with diode 30 and the voltage produced on top of resistor 29 will be relatively small. If that voltage is below the zener voltage of diode 31, no pulse will be delivered through it. It is evident, therefore, that for high rate pulses the output terminal of the voltage sensitive zener diode will be in one state and for low rate pulses, it will have another state.

It should be evident that the interference rejector can be made to respond to different pulse repetition rates by changing the values of coupling capacitor 28, resistor 25 or the voltage level of zener diode 31. In addition, different amplitude pulses 25 will alter the rejector's selection of various pulse repetition rates.

If zener diode 39 is omitted or if battery 14 voltage falls below this zener voltage as the battery depletes, then the output pulses 25 from trigger 22 will be reduced proportionally in amplitude as battery voltage changes, thereby affecting the voltage at the top of resistor 29, which controls the conduction of zener diode 31. It is apparent that a reduced pulse 35 amplitude below the zener 31 voltage will produce no output pulse 32. This results in the pace pulse generator operating in its fixed rate mode as will appear more clearly later.

Other voltage sensitive devices may, of course, be substituted for zener diode 31. Those skilled in the art will appreciate that a Schmitt trigger circuit or a saturating operational amplifier may be substituted for zener diode 31 to obtain a change of state in response to signals which are coupled through capacitor 28.

As stated earlier, there are several kinds of electric signals which may be detected on the body. Atrial and ventricular signals associated with natural stimulation of the heart are examples of rather high potential signals. There are other bioelectric potentials associated with body chemistry, muscle action, nerve impulses and the like. Some of these may be considered interference signals insofar as stimulation of a particular organ is concerned. There are also signals due to extraneous electrical interference that is picked up by the body or radiated to it from an outside source such as a sparking electrical appliance. In addition, signals for stimulating or controlling an organ, such as pulses from a heart pace pulse generator, may also be detected in or on the body.

Assume, for example, that a tolerable heart rate range for a subject being stimulated with a standby heart pacer is from 60 to 120 beats per minute. A desirable and expected rate for a subject who is undergoing relatively low physical activity would be about 68 to 75 beats per minute. A healthy heart that is beating under the influence of its own conduction system would produce a corresponding number of detectable natural electric impulses. At the same time, the body may be picking up extraneous electrical interference which may have many high frequency components, but has the effect of relatively high rate discrete pulses appearing on the body. In the case of a standby pacer, artificial pulses may also be applied to the body to stimulate the heart, usually at a rate of about 71 beats per minute. Of course, a standby pacer is indicated in cases where the heart periodically responds to one or more of its natural stimuli, in which case, fewer artificial stimulating pulses are injected to maintain the heart at a minimum beating rate.

In the illustrated heart pacer, the interference rejector is used to provide a control signal for turning on a heart pace pulse generator if a natural heart beat is missed or delayed for a predetermined time and to also turn it on if there is overwhelming interference or if the heart exceeds some predetermined rate, such as, 120 beats per minute, which is the case if it is in tachycardia or undergoing disturbances. In the instant device, the pulse generator will also turn on if the battery voltage declines by a certain amount as was mentioned earlier.

The effect of artificial stimulating pulses may be eliminated from the interference rejector 27 by inhibiting gated threshold trigger 22 through the agency of clamping transistor 61 whenever an artificial pacing pulse is detected. Other signals, of course, are detected at the rate at which they are produced and they cause pulses such as 25 to be produced at a corresponding rate. Generally, the subject will not be exposed to extraneous electric interference, in which case, pulses 25 corresponding with the production and detection of natural heart stimuli will be coupled to capacitor 28 and cause the output of the interference rejector to be in one state. When high rate pulses occur as they do in the presence of high rate interference, coupling capacitor 28 will not accept more charge because of the short discharge period between pulses and zener diode 31 will not be rendered conductive, in which case, the output of the interference rejector 27 will be in another state. It is thus evident that detected signals coming in at a desirable rate can be distinguished from higher rate interference signals.

The interference rejector may be used to control tachycardia or other arrhythmias by setting the values of resistors 35, 36 so that high rate signals also associated with atrial and ventricular tachycardia or arrhythmia are detected and treated as high frequency interference. If the discharge rate of capacitor 28 is slow by reason of resistor 35 having a high value, then only relatively low rate pulses will be coupled through capacitor 28. If the discharge rate is made comparatively faster, then higher rate pulses may be coupled through capacitor 28 and the voltage sensitive zener diode 31. Hence, by properly choosing resistor 35, in particular, the rejector may be caused to assume one output state corresponding with pulses in an acceptable heart rate range and to assume another output state when the heart is in arrhythmia or tachycardia even for the period of two beats. This is accomplished by controlling the pace pulse generator which is generally designated 51 and will now be described.

Pace pulse generator 51 has a timing network including series connected resistors 57, 56, and 55 and a timing capacitor 54 all which are connected between positive line and ground. Capacitor 54 charges and will cause the pulse generator to turn on when it reaches a certain voltage level unless it is prematurely discharged in whole or in part. There is a voltage divider including resistors 48, 49 for controlling the bias on the pace pulse generator. Point A in the divider has a specific positive value with respect to ground. A capacitor 50 in parallel with resistor 49 stabilizes the d-c voltage at point A. When timing capacitor 54 charges to above a certain value, it causes a transistor 52 to become forward-biased through its emitter-base circuit and a resistor 58 leading to point A. As the timing capacitor 54 charges, its voltage is increasing toward the point where transistor 52 will be forward-biased for producing a pace pulse. Such a pace pulse will be produced unless capacitor 54 is prematurely discharged as mentioned above. When capacitor 54 is charged sufficiently, it will apply the necessary current to forward-bias the emitter-to-base circuit of transistor 52 thru a path which includes resistor 58 and it also renders the emitter-to-collector circuit of transistor 52 conductive and causes a pulse 59 to appear on the collector. The pulse duration is about two milliseconds which is desirable for stimulating the heart. The latching voltage keeping this multivibrator circuit in conduction appears across resistor 58 and is additive to the bias voltage across resistor 48. The other transistor 53 in the pace pulse generator also conducts when an artificial pacing pulse is delivered and the potential appearing on its emitter is applied to a resistor 92 and a conductor 60 through the base of the gating transistor 61 at the far left of the drawing. A filter network including parallel capacitor 90 and a resistor 91 prevents the emitter of transistor 53 from floating above ground potential while providing emitter impedance during the conductive state of transistor 53. The purpose of applying a signal to transistor 61 is to render it conductive and thereby inhibit the threshold trigger 22 so that it does not sense or respond to artificial pacing signals. When transistor 61 conducts, the top of resistor 24 is placed at ground potential and the bias is removed from threshold trigger 22 so it produces no output pulse 25.

Output pulses 59 appearing on the collector of transistor 52 produce a signal voltage across a resistor 62 in the pacing pulse generator 51. This signal voltage is transmitted through a resistor 63 to the base of a transistor 64. Transistor 64 has a current limiting resistor 65 in its emitter circuit and a high value collector resistor 66. Between pulses and between conduction intervals of transistor 64, a heart coupling capacitor 67 slowly charges through high resistance 66. The slow charge rate is insufficient to stimulate the heart. However, when a pulse is delivered to transistor 64, and it becomes conductive, capacitor 67 is discharged in a little more than two milliseconds and this results in sufficient current flow to stimulate one heart beat. This process is repeated as long as the pacing pulse generator is operating and the heart beats at the intrinsic rate of the pulse generator.

It should be noted that neither the output circuit including transistor 64 and coupling capacitor 67 nor the pacing pulse generator consume anything more than leakage current when they are in their standby state.

Timing capacitor 54 in the pace pulse generator is discharged prematurely so it produces no pacing pulse in response to appropriate control signals from the interference rejector which is equivalent to saying that this happens when the output of the interference rejector is in an appropriate state.

Pulses which are transmitted through zener diode 31 in the interference rejector are applied to the base of a transistor 33, forward-biasing it and rendering the transistor conductive. The base-emitter circuit is parallel with a filter capacitor 34. The collector of transistor 33 connects to positive line through a collector-resistor 37. The collector of transistor 33 is also connected to the collector of a paralleled transistor 82 which becomes forward-biased and conductive when its base-emitter circuit which is in series with the emitter of transistor 33 becomes conductive. The base-emitter circuit of transistor 82 includes a filter network comprising capacitor 84 and resistor 83. The collector of transistor 82 is connected to timing capacitor 54 through a resistor 81 and a diode 80. When transistors 33 and 82 are forward-biased as a result of receiving a control pulse 32, these transistors become conductive and jointly discharge timing capacitor 54 prematurely. That is, the timing capacitor is discharged before it reaches a sufficient voltage level to forward-bias transistor 52 in the pace pulse generator and turn it on.

It should be evident, therefore, that if the heart has produced a natural stimulus, such signal will be detected and transmitted through the interference rejector, causing timing capacitor 54 to be discharged so that no artificial pulse will be applied to the heart. If, on the other hand, no natural stimulus occurs for a predetermined period of time, such as one-sixtieth of a minute, timing capacitor 54 will reach a voltage level which will cause the pacing pulse generator to be turned on for at least one beat so that the heart will be stimulated artificially at the end of the one-sixtieth of a minute period. If the next one or more natural stimuli are not detected, the pace pulse generator will continue stimulating at a higher rate such as every one-seventieth of a minute because timing capacitor 54 will reach its forward-biasing level earlier when it is not discharged prematurely by the occurrence of a natural stimulus.

Assume now that interference signals are present on the body and detected and manifested by high repetition rate pulses 25 from the threshold trigger. These high rate pulses cannot be coupled through coupling capacitor 28 in the interference rejector as explained earlier, in which case, there is no control pulse 32 produced at the output side of zener diode 31 nor is there any change in its output state. Accordingly, transistors 33 and 82 will not conduct and the timing capacitor 54 in the rate generator will reach the level where it can turn on the pace pulse generator. It is evident, therefore, that in the presence of interference, the pace pulse generator will turn on or fail-safe and provide stimulating pulses to the heart to assure that it will beat in case natural stimuli do not occur during the period of interference.

The interference rejector 27 may also be used to control arrhythmia or tachycardia of the heart. Under these heart conditions signals are detected on the body which collectively look like high rate interference in which case they will not get through coupling capacitor 28 in the interference rejector. It follows that zener diode 31 will not be conductive nor will a signal be produced that would cause premature discharge of timing capacitor 54, in which case, an artificial pulse is applied to the heart. The one or more ensuing injected artificial stimulating pulses are often sufficient to depolarize the heart cells simultaneously and cause the heart to pause after which natural rhythm can be restored.

Those skilled in the art will appreciate that the new interference rejector may be used in other body organ stimulators as well as in implantable and external standby heart pacers. It is only necessary to detect the presence of body signals and supply them to the interference rejector which will distinguish those that are in an acceptable repetition rate range from those that are not, and will produce alternate control signals that can be used to turn on or turn off the stimulator or provide some other control function as desired. It should also be evident that the interference rejector can be designed to operate inversely, that is, to control with the detected pulses having a high repetition rate instead of a low rate.

Another important application is for analyzing the function of implanted stimulators which have the new interference rejector incorporated. The pacer described herein, for example, can be shifted to its fixed rate mode by intentional application of externally applied control signals. Some pacers sense atrial signals and produce a delayed ventricular pulse so the two heart chambers function in there natural sequence. The interference rejector can be adapted so that pulses may be injected at a proper rate to produce various systems responses and the function of different parts of the system can be individually determined.

Although an embodiment of the new interference rejector has been described in considerable detail in connection with a standby heart pacer, such description is intended to be illustrative rather than limiting for the rejector may be variously embodied and may be used with a variety of stimulators. Accordingly, the scope of the invention is to be determined exclusively by interpreting the claims which follow.

I claim:

1. A body organ stimulator comprising:
   a. a pulse generator that is adapted to be connected to the body and that has a timing network which effects stimulating signals with a predetermined period,
   b. detector means for detecting body signals comprised of natural signals, or artificial pace signals, and combinations thereof, and for producing corresponding detector output signals,
   c. an interference signal rejector comprising:
      i. a resistor network comprising first and second circuits,
      ii. a coupling capacitor connected between said detector means and said resistor network to receive detector output signals directly from said detector means corresponding with the detected body signals and said capacitor being charged to a predetermined voltage level at one rate through said first circuit of said resistor network and to be discharged at a different rate through said second circuit of said resistor network,
      iii. a signal level sensing device connected at the junction of said coupling capacitor and said resistor network for sensing a voltage on said resistor network which corresponds to the difference between the detector output signal and the voltage on said coupling capacitor, the voltage on said capacitor depending on the repetition rate of the detector output signals which charge it and the voltage on the resistor network during occurrence of a detector output signal depending on the level to which the capacitor is discharged between such signals,
      iv. said signal level sensing device having different output states depending on the magnitude of the difference between the detector output signal and the voltage on said coupling capacitor,
   said signal level sensing device having a first output state when the detector output signals have a repetition rate within certain limits, and having a second output state when the detector output signals have a repetition rate outside the certain limits,
   d. switching means responsive to one state of said signal level sensing device by being nonconductive and to another state by being conductive, and
   e. a capacitor connected to said switching means and said pulse generator, operation of said pulse generator depending on the voltage on said capacitor resulting from conduction or nonconduction of said switching means and the state of said level sensing device.

* * * * *